United States Patent
Ryu et al.

(10) Patent No.: US 7,950,528 B2
(45) Date of Patent: May 31, 2011

(54) HOLLOW FIBER MEMBRANE AND METHOD FOR MANUFACTURING THE SAME

(75) Inventors: JaeHee Ryu, Seoul (KR); Moo-Seok Lee, Seoul (KR)

(73) Assignee: Kolon Industries, Inc., Kwacheon-si (KR)

( * ) Notice: Subject to any disclaimer, the term of this patent is extended or adjusted under 35 U.S.C. 154(b) by 273 days.

(21) Appl. No.: 12/186,686

(22) Filed: Aug. 6, 2008

(65) Prior Publication Data
US 2009/0039012 A1 Feb. 12, 2009

(30) Foreign Application Priority Data
Aug. 7, 2007 (KR) .................. 10-2007-0078829

(51) Int. Cl.
*B01D 63/02* (2006.01)
*B01D 69/08* (2006.01)
*B01D 61/00* (2006.01)

(52) U.S. Cl. ......... 210/500.23; 210/321.79; 210/321.88; 264/211.14

(58) Field of Classification Search .................. None
See application file for complete search history.

(56) References Cited

U.S. PATENT DOCUMENTS
2005/0115899 A1   6/2005   Liu et al.

FOREIGN PATENT DOCUMENTS
| JP | 56118701 A | 9/1981 |
| JP | 05184878 A | 7/1993 |
| JP | 11319505 A | 11/1999 |
| WO | 03/106004 A1 | 12/2003 |

OTHER PUBLICATIONS
JP 05-184878—English machine translation; 1993.*
JP-11-319505—English machine translation—1999.*

* cited by examiner

*Primary Examiner* — Krishnan S Menon
(74) *Attorney, Agent, or Firm* — Sughrue Mion, PLLC

(57) ABSTRACT

The present invention relates to a through-one-end water collection type hollow fiber membrane and a method for manufacturing the same. According to the present invention, an internal sealing part is formed in the hollow part of the membrane at its free end. The internal sealing part supports an external sealing part surrounding the external surface of the free end such that the durability of the whole sealing part might be improved.

3 Claims, 3 Drawing Sheets

HOLLOW FIBER MEMBRANE AND METHOD FOR MANUFACTURING THE SAME

This application claims the benefit of Korean Patent Application No. 10-2007-0078829 filed on Aug. 7, 2007, which is hereby incorporated by reference for all purposes as if fully set forth herein.

BACKGROUND OF THE INVENTION

1. Field of the Invention

The present invention relates to a hollow fiber membrane and a method for manufacturing the same, and more particularly to a through-one-end water collection type hollow fiber membrane having a free end which is not fixed to a header whereby permitting relatively free movement of the membrane when submerged in feed water to be treated.

2. Discussion of the Related Art

A separation method using a membrane has lots of advantages compared to the method based on a phase inversion or heating. Among the advantages is high reliability of water treatment since the water purity required may be easily and stably satisfied by adjusting the size of the pores of a membrane. Further, a membrane can be used with microorganism which is useful for separation process but may be adversely affected by heat.

A membrane for separation includes a flat sheet membrane and a hollow fiber membrane.

A hollow fiber membrane module carries out a separation process using a bundle of hollow fiber membranes. Typically, a hollow fiber membrane module has been widely used in the field of microfiltration and ultrafiltration for obtaining axenic water, drinking water, super pure water, and so on. Recently, however, application of the hollow fiber membrane module is being expanded to include wastewater treatment, solid-liquid separation in a septic tank, removal of suspended solid (SS) from industrial wastewater, filtration of river, filtration of industrial water, and filtration of swimming pool water.

Among such hollow fiber membrane modules is a submerged hollow fiber membrane module which is submerged into a tank of feed water to be treated. Negative pressure is applied to the internal parts of the hollow fiber membranes such that only fluid passes through the walls of the membranes and solids and sludge are rejected and accumulate in the tank. A submerged hollow fiber membrane module is used mainly in the form of a cassette having a plurality of modules combined to a frame. A submerged hollow fiber membrane module is advantageous in that the manufacturing cost is relatively low and that the installation and maintenance cost may be reduced since a facility for circulating fluid is not required.

When a submerged hollow fiber membrane module is used to treat wastewater, the solids in the wastewater fouls the membrane causing the permeability of the membrane to be declined as the wastewater is treated. The solids may be present in the feed water in a variety of forms which contribute to fouling in different ways. To counter the different types of fouling, many different types of cleaning regimens may be required.

Such cleaning may be classified into maintenance cleaning and recovery cleaning according to the cleaning purposes.

The maintenance cleaning is a cleaning performed while the water treatment is carried out by the hollow fiber membrane module or a cleaning performed only for a short time after the water treatment is stopped. The main purpose of the maintenance cleaning is to maintain the permeability of the membranes in good status. The maintenance cleaning is generally carried out by physical cleaning. The most frequently used methods of physical cleaning are backwashing and aeration.

In backwashing, permeation through the membranes is stopped momentarily. Air or water flows through the membranes in a reverse direction to physically push solids off of the membranes. On the other hand, in aeration, bubbles are produced in the tank water below the membranes. As the bubbles rise, they agitate or scrub the membrane and thereby remove the solids while creating an air lift effect and circulation of the tank water to carry the solids away from the membranes.

Based on the water collection type, a submerged hollow fiber membrane module may be classified into a through-both-ends water collection type and a through-one-end water collection type. According to a through-both-ends water collection type, the permeate obtained inside each hollow fiber membrane is collected through both ends of the membranes. On the other hand, the permeate is collected through only one end of each membrane in a through-one-end water collection type.

In case of a through-both-ends water collection type hollow fiber membrane module, two ends of the membrane are fixed to two headers respectively. Each header has a permeate collecting space therein with which the membrane is in fluid communication. When performing maintenance cleaning by means of aeration, upward movement of bubbles from a aeration tube are interrupted by the headers especially when the hollow fiber membrane module is a vertical type. An upper header has the effect of displacing the rising bubbles towards the outside of the membrane bundle. Thus, effective aeration is no longer guaranteed in the upper region of the membrane. As a consequence, relatively severe fouling occurs in the upper region of the membrane bundle.

On the other hand, in case of a through-one-end water collection type hollow fiber membrane module, only one end of the membrane is fixed to a header and the other end, a free end, is free to move. Thus, interruption of water flow caused by rising bubbles emitted from the aeration tube is remarkably reduced, and thus a vertical hollow fiber membrane of through-one-end water collection type may guarantee more effective aeration over the entire length of the membrane than a vertical hollow fiber membrane of through-both-ends water collection type. For this reason, a hollow fiber membrane of through-one-end water collection type has been actively studied.

Since the free ends of the membranes in the through-one-end water collection type hollow fiber membrane module are not fixed to a header, every each of the membranes must be sealed at their free ends. Since the durability of sealing part is relatively weak, the durability of the whole hollow fiber membrane depends on how to seal the free ends of the membranes.

A method of sealing a hollow fiber membrane at its free end comprises coating the free end with a sealant of same polymer, e.g., polyethersulfone (PES), as that of the membrane, and curing the sealant. FIG. 1 shows a cross section of a hollow fiber membrane sealed with this method. As shown in FIG. 1, the sealing part 110 exists only on the external surface of the free end of the hollow fiber membrane 100. Thus, the sealing part 110 is vulnerable and might be easily stripped off from the membrane 100 causing leakage, which requires replacement of the impaired membrane 100 and thus increases the maintenance cost.

SUMMARY OF THE INVENTION

Accordingly, the present invention is directed to a hollow fiber membrane and a method for manufacturing the same that substantially obviates one or more of the problems due to limitations and disadvantages of the related art.

An advantage of the present invention is to provide a hollow fiber membrane used for a through-one-end water collection type hollow fiber membrane module and a method for manufacturing the same, wherein the hollow fiber membrane is provided with a sealing part of improved durability at its free end.

Another advantage of the present invention is to provide a composite hollow fiber membrane sealed at its free end without impairing the coating layer thereof and a method for manufacturing the same, wherein the sealing part has high durability.

Further another advantage of the present invention is to provide a hollow fiber membrane having a free end surrounded by a sealing part a portion of which is inserted into the hollow part of the membrane in sufficient length, and a method for manufacturing the same.

Still further another advantage of the present invention is to provide a hollow fiber membrane sealed with a sealant effectively at its free end, and a method for manufacturing the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, there is provided a hollow fiber membrane comprising an external sealing part surrounding an external surface of a first end of the hollow fiber membrane, and an internal sealing part in a hollow part of the hollow fiber membrane at the first end.

In another aspect of the present invention, there is provided a method for manufacturing a hollow fiber membrane, the method comprising forming an internal sealing part in a hollow part of the hollow fiber membrane at an end of the hollow fiber membrane, and forming an external sealing part surrounding an external surface of the end of the hollow fiber membrane.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

Figure 1:
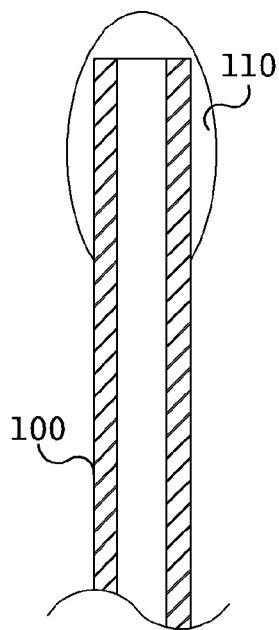
FIG. 1 is a cross sectional view illustrating a conventional hollow fiber membrane.
Figure 2:
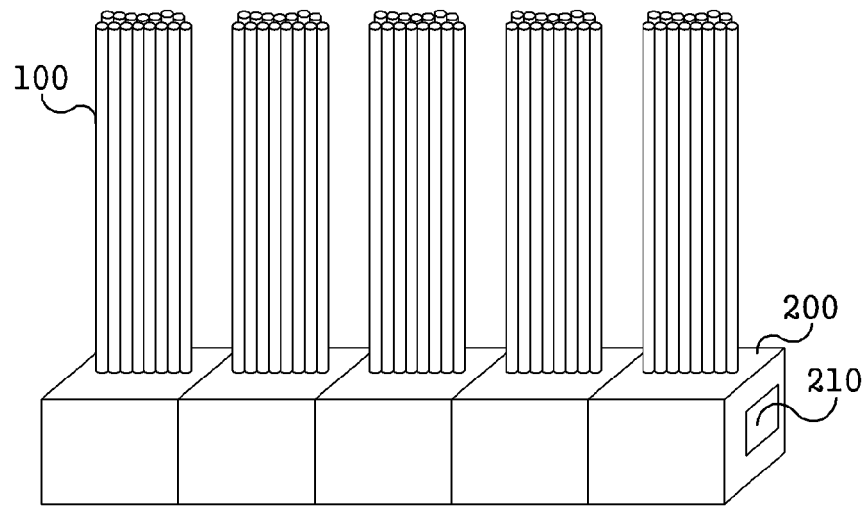
FIG. 2 is a perspective view illustrating a through-one-end water collection type hollow fiber membrane module of the present invention.

FIG. 2 is a perspective view illustrating a through-one-end water collection type hollow fiber membrane module of the present invention.

A through-one-end water collection type hollow fiber membrane module, as shown in FIG. 2, has a bundle of hollow fiber membranes 100. An end of each membrane 100 is potted into a header 200 inside which a water collecting space 210 is formed. The end of the membrane 100 potted into the header 200 is open and thus in fluid communication with the water collecting space 210. Thus, the permeate which flows into the hollow part through the membrane 100 can flow to the water collecting space 210. The other end, a free end, of the membrane 100 is not fixed to anywhere and is sealed for the feed water not to be able to flow into the hollow part through the open free end.

The hollow fiber membrane 100 may be a porous single membrane comprising a polymer such as polyethersulfone (PES), polysulfone(PS), and polyvinylidene difluoride (PVDF) or a composite membrane comprising a tubular braid and a polymer coating layer thereon.

Figure 3:
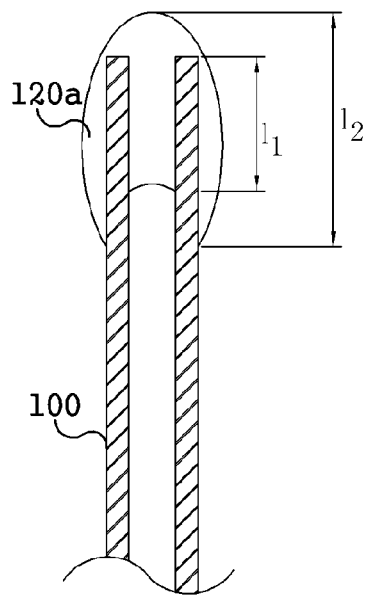
FIG. 3 is a cross sectional view illustrating a hollow fiber membrane according to the first embodiment of the present invention.
Figure 4:
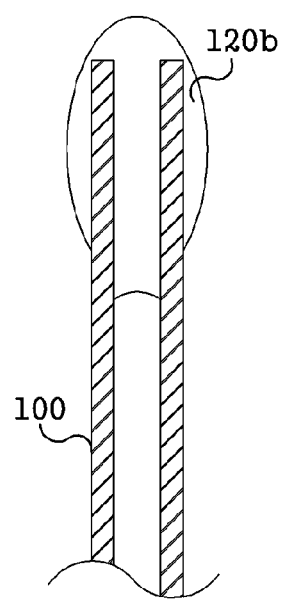
FIG. 4 is a cross sectional view illustrating a hollow fiber membrane according to the second embodiment of the present invention.
Figure 5:
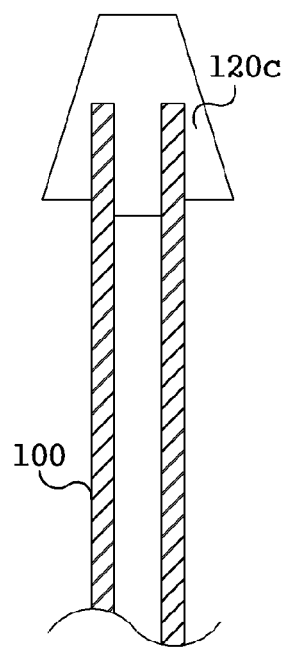
FIG. 5 is a cross sectional view illustrating a hollow fiber membrane according to the third embodiment of the present invention.

FIGS. 3 to 5 are cross sectional views illustrating hollow fiber membranes according to the first, second, and third embodiments of the present invention respectively.

As shown in FIGS. 3 to 5, the hollow fiber membrane 100 of the present invention has a free end which is not fixed to anywhere. The free end is closed by sealing part 120a, 120b, and 120c. The sealing part 120a, 120b, and 120c comprises an external sealing part surrounding the external surface of the free end, and an internal sealing part in the hollow part of the membrane 100 at the free end. The internal sealing part supports the external sealing part thereby improving the durability of the whole sealing part 120a, 120b, and 120c.

According to an illustrative embodiment of the present invention, the length $l_1$ of the internal sealing part is 1 to 200% of the length $l_2$ of the external sealing part. The length $l_1$ and $l_2$ of the internal and external sealing parts are parallel to a longitudinal direction of the hollow fiber membrane 100. If the length $l_1$ of the internal sealing part is less than 1% of the length $l_2$ of the external sealing part, the internal sealing part can hardly support the external sealing part. On the contrary, if the length $l_1$ of the internal sealing part is more than 200% of the length $l_2$ of the external sealing part, it takes too much time to cure the internal sealing part, too much sealant is consumed, and the durability of the sealing part 120a, 120b, and 120c may be reduced due to the low viscosity of the sealant when the internal and external sealing parts are formed of the same material.

The length $l_1$ of the internal sealing part of the embodiment shown in FIG. 3 is shorter than the length $l_2$ of the external sealing part. On the other hand, the length $l_1$ of the internal sealing part of the embodiment shown in FIG. 4 is longer than the length $l_2$ of the external sealing part.

In cases of the hollow fiber membranes 100 according to the first, second, and third embodiments of the present invention respectively shown in FIGS. 3 to 5, the external and internal sealing parts may be formed of the same sealant substantially simultaneously. That is, the step for forming the internal sealing part in the hollow part of the membrane 100 at the free end and the step for forming the external sealing part surrounding the external surface of the free end may be performed at the same time. A method for forming the external and internal sealing parts simultaneously will be illustrated in detail hereinafter.

First, the viscosity of the sealant is adjusted such that the sealant might be effectively drawn into the hollow part of the membrane 100 by capillary phenomenon. The viscosity of the sealant depends on the temperature of the sealant and the characteristics of the material itself. According to an illustrative embodiment of the present invention, the sealing part 120a, 120b, and 120c is formed of polyurethane. When polyurethane having viscosity of about 1,000 to 3,000 cps is used at ambient temperature, the length $l_1$ of the internal sealing part will be shorter than the length $l_2$ of the external sealing part. On the contrary, when polyurethane having viscosity of about 100 to 500 cps is used at a temperature above 30° C., the length $l_1$ of the internal sealing part will be longer than the length $l_2$ of the external sealing part.

When the hollow fiber membrane 100 is a composite membrane comprising a tubular braid as a reinforcing structure and a polymer coating layer formed thereon, it might be advantageous that the sealing part 120a, 120b, and 120c and the coating layer are formed of materials different from each other for the reason described below.

When the hollow fiber membrane 100 is submerged into a sealant of same polymer, e.g., polyethersulfone (PES), as that of the coating layer of the membrane to form the sealing part 120a, 120b, and 120c at the free end, the PES solution should have viscosity low enough for the solution to be drawn into the hollow part of the membrane 100 at the free end. The PES solution may be prepared by dissolving PES into its good solvent such as DMAc, DMF, NMP, and so on. The amount of the solvent should be increased to lower the viscosity of the PES solution. When the viscosity of the solution becomes too low, however, some problems as follow might occur.

First, the solvent of the PES solution may dissolve the PES coating layer as well thereby impairing the membrane 100. Second, the thickness of the sealing part, especially the portion corresponding to the corner of the free end, cannot but be reduced due to the low viscosity of the PES solution, and thus the possibility of the impairment of the membrane and leakage at that point increases.

Hence, it may be advantageous that the sealing part 120a, 120b, and 120c comprises a material, e.g., polyurethane, silicone, heat-cured polymer, or UV-cured epoxy polymer, which is different from that of the coating layer of the membrane 100.

After the viscosity of the sealant is adjusted, a mold having an inside space of a predetermined shape is filled with the viscosity-adjusted sealant. In cases of the first and second embodiments of the present invention as respectively shown in FIG. 3 and FIG. 4, the predetermined shape of the inside space of the mold is a streamlined shape, and thus the sealant cured in the mold would also have the streamlined shape and could hardly be pulled out from the mold. Thus, if having a inside space of a streamlined shape, the mold had better be formed of a material which can be easily removed, e.g., paraffin.

In case of the third embodiment of the present invention as shown in FIG. 5, the cross section of the external sealing part perpendicular to the longitudinal direction of the hollow fiber membrane 100 becomes smaller as farther from the other end of the hollow fiber membrane 100 opposite to the free end. Thus, the cured sealant of the third embodiment of the present invention can be easily pulled out from the mold and the mold need not be removed. Therefore, the third embodiment of the present invention has an advantage in that there is no limitation on the material forming the mold.

After the inside space of the mold is filled with the viscosity-adjusted sealant, the free end of the hollow fiber membrane 100 is submerged into the viscosity-adjusted sealant in the mold. By controlling the submerging time, the length by which the sealant is drawn into the hollow part of the membrane 100 can be adjusted. Subsequently, the sealing part 120a, 120b, and 120c is formed by curing the sealant with heat or UV irradiation while the free end of the hollow fiber membrane 100 is submerged in the sealant.

After the sealant is cured, as mentioned above, the molds of the first and second embodiments of the present invention as illustrated in FIG. 3 and FIG. 4 are removed. For example, if the mold is made of paraffin, the mold can be removed by applying heat to the mold. On the other hand, in the third embodiment of the present invention as illustrated in FIG. 5, the sealing part 120c can be compulsorily pulled out from the mold since the cross section of the sealing part 120c perpendicular to the longitudinal direction of the hollow fiber membrane 100 becomes smaller as farther from the other end of the hollow fiber membrane 100 opposite to the free end.

Figure 6:
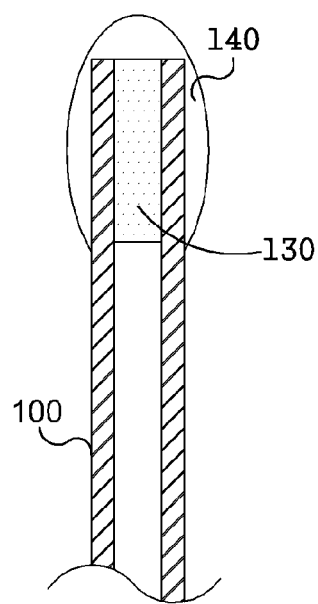
FIG. 6 is a cross sectional view illustrating a hollow fiber membrane according to the fourth embodiment of the present invention.

Referring to FIG. 6, a hollow fiber membrane and a method for manufacturing the same according to the fourth embodiment of the present invention will be described below.

A hollow fiber membrane 100 according to the fourth embodiment of the present invention comprises an internal sealing part 130 in the hollow part of the membrane 100 at the free end and an external sealing part 140 surrounding the external surface of the free end. The internal and external sealing parts 130 and 140 are formed of materials different from each other.

An exemplary method for manufacturing the hollow fiber membrane 100 according to the fourth embodiment of the present invention will be described below.

The first sealant is compulsorily injected into the hollow part of the membrane 100 at the free end by means of an injector to form the internal sealing part 130. Then, the end of the hollow fiber membrane 100 having the first sealant thereinside is submerged into the second sealant to form the external sealing part 140.

Contrary to the first to third embodiments of the present invention in which the sealant is drawn into the hollow part by capillary phenomenon, according to the fourth embodiment of the present invention, the first sealant is compulsorily injected into the hollow part to form the internal sealing part 130, and can be put into the hollow part without contacting with the external surface of the hollow fiber membrane 100. Thus, when the membrane 100 is a composite membrane, the first sealant does not come into contact with the coating layer of the membrane 100 thereby avoiding the problem that the coating layer dissolves in the solvent of the first sealant even if the material of the coating layer is used for the first sealant. As a consequence, the fourth embodiment of the present invention is advantageous in that the internal sealing part 130 can be formed of the same material as that of the coating layer and a sealant of high viscosity can be used as the second sealant since the external sealing part 140 is formed after the internal sealing part 130 is formed.

Optionally, the external sealing part 140 may be made of a material different from that of the coating layer of the composite membrane 100 lest the coating layer should dissolve in the solvent of the second sealant.

As an exemplary embodiment of the present invention, the external sealing part 140 comprises polyurethane, silicone, heat-cured polymer, or UV-cured polymer, and the internal sealing part 130 comprises the same material as that of the coating layer, e.g., polyethersulfone(PES), polysulfone(PS), or polyvinylidene difluoride(PVDF).

According to the hollow fiber membrane and method for manufacturing the same of the present invention as above, a sealant can be easily put into the hollow part of the through-one-end water collection type hollow fiber membrane at its free end to form the internal sealing part without impairing the coating layer of the membrane, and the internal sealing part supports the external sealing part thereby improving the durability of the whole sealing part.

Hence, the hollow fiber membrane and method for manufacturing the same of the present invention can prevent the impairment of the sealing part that may occur during module operation, thereby guaranteeing more stable water treatment and cutting down the maintenance fee.

Although the hollow fiber membrane of the present invention is described as one used in the field of the water treatment, it will be apparent to those skilled in the art that it may also be applied to other area where a hollow fiber membrane having at least one end sealed can be used.

What is claimed is:

1. A method for manufacturing a hollow fiber membrane, the method comprising:
   adjusting the viscosity of a sealant;
   introducing the viscosity-adjusted sealant into a mold having an internal space of a predetermined shape;
   submerging one end of a single hollow fiber membrane into the viscosity-adjusted sealant in the mold so that the one end of the hollow fiber membrane is filled with the viscosity-adjusted sealant and is surrounded by the viscosity-adjusted sealant; and
   curing the sealant while the end of the hollow fiber membrane is kept submerged in the viscosity-adjusted sealant.

2. The method of claim 1, further comprising removing the mold after curing the sealant.

3. The method of claim 1, further comprising pulling out the hollow fiber membrane together with the cured sealant from the mold.

* * * * *